A. ZANVETTOR.
MACHINE FOR MAKING MAGNESIA IN GRANULAR FORM.
APPLICATION FILED APR. 25, 1916.

1,251,612.  Patented Jan. 1, 1918.
2 SHEETS—SHEET 2.

Inventor:
Augusto Zanvettor,
by _____, Atty.

UNITED STATES PATENT OFFICE.

AUGUSTO ZANVETTOR, OF WEST HOBOKEN, NEW JERSEY.

MACHINE FOR MAKING MAGNESIA IN GRANULAR FORM.

1,251,612.  Specification of Letters Patent.  Patented Jan. 1, 1918.

Application filed April 25, 1916. Serial No. 93,560.

*To all whom it may concern:*

Be it known that I, AUGUSTO ZANVETTOR, a subject of the King of Italy, residing at West Hoboken, in the county of Hudson and State of New Jersey, have invented certain new and useful Improvements in Machines for Making Magnesia in Granular Form; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a machine for furnishing in elongated form, of greater or less length, commercial granulated magnesia used for therapeutical and other purposes. It has for its object to provide a machine in which the magnesia preparation may be expeditiously compressed into form, more or less elongated, so that it may be more conveniently handled and be less likely to cake, and waste avoided. To the accomplishment of the foregoing and such other objects as may hereinafter appear the invention consists in the features hereinafter particularly described and then sought to be clearly defined by the claims, reference being had to the accompanying drawing forming a part hereof and in which—

Figure 1:
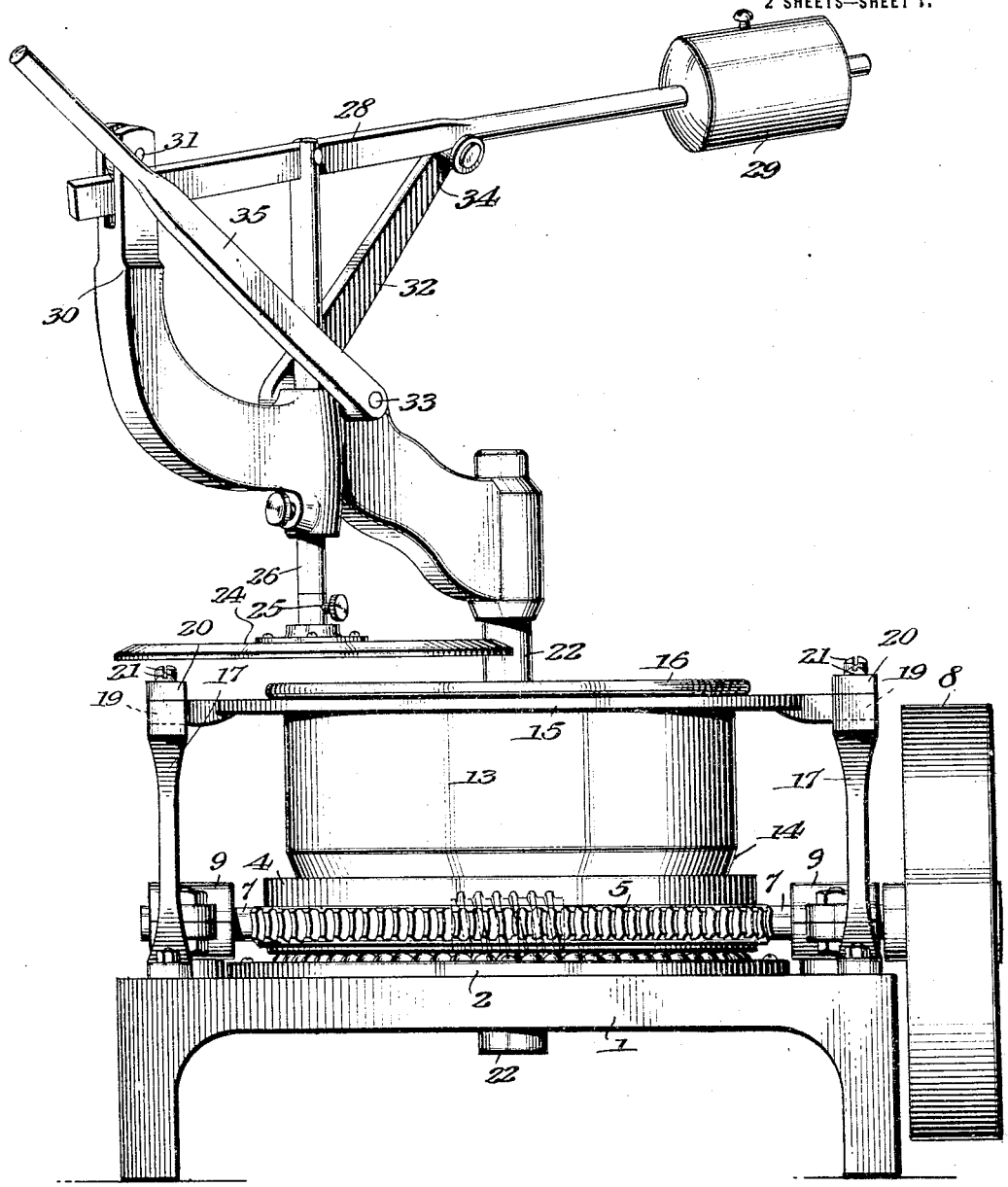

Figure 1 is a side elevation of a machine embodying the invention.

Figure 2:
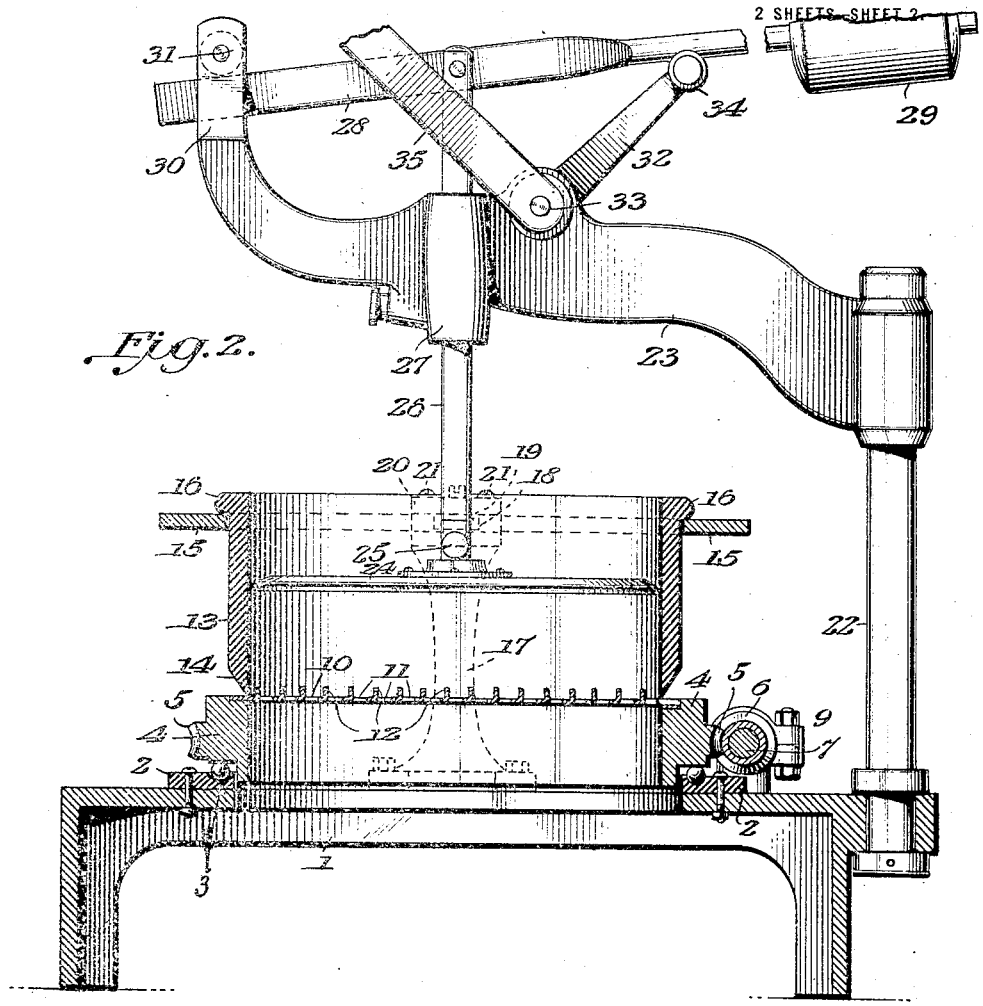

Fig. 2 a vertical section through the same.

Figure 3:
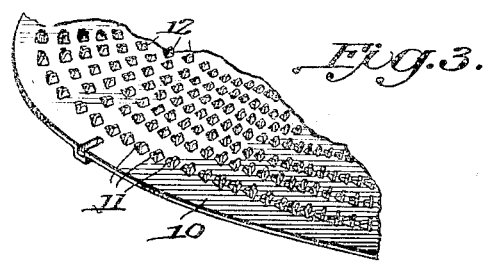

Fig. 3 a perspective of toothed plate, partly broken away.

In the drawing the numeral 1 designates a base of any suitable form upon which rests a ring 2 constituting a race for anti-friction ball-bearings 3. Upon these balls rests a ring or annulus 4 having worm teeth 5 on its periphery with which meshes a worm 6 attached to a shaft 7 driven by a pulley 8, or otherwise, and journaled in bearing boxes 9 suitably supported upon the base. The rotating ring or annulus 4 carries a disk 10 formed with perforations or openings 11 and upwardly projecting lips or teeth 12, which are preferably formed by cutting the metal of the disk and bending up the lips or teeth. Above the disk 10 is supported an open bottomed pot or vessel 13 so that its lower edge will lie in relatively close contact with the face of the disk 10 but without causing undue friction therewith. For that purpose the lower edge of the pot or vessel is formed with a bevel 14 as shown, and the pot is supported by a ring 15 upon which will rest a flange 16 formed at the top of the pot. The supporting ring 15 is sustained by standards or brackets 17 formed in their upper ends with sockets 18 in which will fit lugs 19 projecting from the ring 15 and above which will be placed plates 20 secured to the brackets by bolts 21 so as to hold the ring securely in place.

At one side of the base-plate 1 there is suitably supported an upright post 22 at the upper end of which is rotatably mounted a bracket 23 which carries a vertically reciprocating follower or plunger 24 adapted to fit in the pot or vessel 13 and attached by a set screw 25, or otherwise to a plunger rod 26 working in a sleeve 27 formed as a part of the overhanging bracket 23 and having an arm or lever 28 pivotally connected to its upper end. This arm or lever is provided with an adjustable weight 29 by adjustment of which the downward pressure of the follower 24 may be regulated, and is fulcrumed in the forked end 30 of the bracket 23 at which point may be provided a friction roller or bearing 31 for that end of the arm or lever. The bracket 23 also carries a crank arm 32 attached at one end to a shaft 33 journaled in the bracket and having a friction roll 34 to bear against the arm or lever 28 and a handle or lever 35 attached to the other end of shaft 33 so that by manipulating the handle the weighted arm may be lifted so as to raise the follower or plunger out of the pot or vessel and permit it to be swung to one side with the bracket when access is to be had to the interior of the pot for filling it with material or for other purposes.

In operation the magesia preparation is placed in the pot and the bracket carrying the follower and weighted arm swung into position so that the follower will rest on top of the material under the pressure exerted by the weight adjusted to position to exert the desired pressure. The worm gear carrying the toothed perforated plate is rotated by the worm on the power shaft and carries with it the perforated toothed plate so that the teeth of the plate will agitate and mix the material resting on the plate and break up or reduce the size of any undesirable relatively large particles of the material, and the pressure exerted on the material by the weighted follower will force the material through the perforations of the plate so that it will be discharged in compressed elongated granules of greater or less length so that it may be handled with greater convenience and less waste.

I have illustrated and described with particularity the preferred details of construction and arrangement of the several parts but changes may be made therein and essential features of the invention retained.

Having described my invention and set forth its merits what I claim is:

1. A machine for forming elongated granules of magnesia comprising a rotary ring formed with gear teeth, a ball-bearing race for supporting the ring, a gear for transmitting motion to the ring, a perforated plate carried by the ring, an open-bottomed pot or vessel supported above the perforated plate, a weighted follower for pressing material in the pot through the perforated plate, and a horizontally swinging bracket for carrying the follower.

2. A machine for forming elongated granules of magnesia, comprising a rotary perforated plate, an open-bottomed pot or vessel supported above the plate with its lower edge in close relation to the plate, a ring from which the pot or vessel is suspended, supports for the ring, and a horizontally swinging bracket provided with a weighted follower for pressing material in the pot through the perforated plate.

3. A machine for forming elongated granules of magnesia, comprising a pot or vessel for containing material, a perforated plate at the bottom of the pot, a bracket carrying a reciprocating follower to act on the material in the pot, a weighted arm pivotally connected to the follower rod and fulcrumed on a part of the bracket, and means for lifting the arm and plunger.

4. A machine for forming elongated granules of magnesia, comprising a pot or vessel for containing material, a perforated plate at the bottom of the pot, a bracket carrying a reciprocating follower to act on the material in the pot, a weighted arm pivotally connected to the follower rod and fulcrumed on a part of the bracket, and a crank-arm and operating handle positioned for the crank arm to bear against the weighted arm to lift it and the follower.

5. A machine for forming elongated granules of magnesia, comprising a pot or vessel for containing material, a perforated plate at the bottom of the pot, a horizontally swinging bracket, a follower to act on the material in the pot and having its rod reciprocable in a sleeve of the bracket, and a weighted arm pivotally connected to the follower rod and fulcrumed at one end in a part of the bracket.

In testimony whereof I have affixed my signature in presence of two witnesses.

AUGUSTO ZANVETTOR.

Witnesses:
   Anthony Barberis,
   Charles C. F. Ehrhardt.

Copies of this patent may be obtained for five cents each, by addressing the "Commissioner of Patents, Washington, D. C."